US012196391B2

(12) United States Patent
Huang

(10) Patent No.: US 12,196,391 B2
(45) Date of Patent: Jan. 14, 2025

(54) LIGHT DISTRIBUTING COMPONENT WITH WEDGE PRISMS AND LIGHTING APPARATUS

(71) Applicants: OPPLE LIGHTING CO., LTD., Shanghai (CN); SUZHOU OPPLE LIGHTING CO., LTD., Suzhou (CN)

(72) Inventor: Junhui Huang, Suzhou (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 18/214,968

(22) Filed: Jun. 27, 2023

(65) Prior Publication Data

US 2023/0341109 A1 Oct. 26, 2023

Related U.S. Application Data

(63) Continuation of application No. PCT/CN2021/140874, filed on Dec. 23, 2021.

(30) Foreign Application Priority Data

Dec. 28, 2020 (CN) ......................... 202011576918.2
Dec. 28, 2020 (CN) ......................... 202023228488.3

(51) Int. Cl.
*F21V 14/06* (2006.01)
*F21V 5/00* (2018.01)
*F21V 17/02* (2006.01)

(52) U.S. Cl.
CPC .............. *F21V 14/06* (2013.01); *F21V 5/008* (2013.01); *F21V 17/02* (2013.01)

(58) Field of Classification Search
CPC ........... F21V 14/06; F21V 5/008; F21V 17/02
See application file for complete search history.

(56) References Cited

U.S. PATENT DOCUMENTS 10,823,358 B1 * 11/2020 Stein ..................... F21S 41/635
2015/0124452 A1 * 5/2015 Sievers ................... F21V 13/04 362/418

(Continued)

FOREIGN PATENT DOCUMENTS

CN 103196083 A 7/2013
CN 108027133 A 5/2018

(Continued)

OTHER PUBLICATIONS

Huang et al., Grading module and illuminating device, CN110081392A, 2019, https://worldwide.espacenet.com/patent/search/family/067416925/publication/CN110081392A?q=pn%3DCN110081392A (Year: 2019).*

(Continued)

*Primary Examiner* — Tracie Y Green
*Assistant Examiner* — Michael Chiang
(74) *Attorney, Agent, or Firm* — Arch & Lake LLP

(57) ABSTRACT

The present disclosure discloses a light distributing component and a lighting apparatus. The light distributing component includes a first lens and a first clamp holding portion; the first lens has a first light incident surface, a first light emergent surface, and a side portion located between the first light incident surface and the first light emergent surface; the first clamp holding portion is arranged on the side portion of the first lens; wherein, the first lens is a light path deflecting element, and an included angle is between the first light incident surface and the first light emergent surface; the first light incident surface is arranged on a transmission path of emergent light of the lighting apparatus, and is used to receive the emergent light; and the first light emergent surface emits out the emergent light to change a propagation path of the emergent light.

20 Claims, 7 Drawing Sheets

(56) References Cited

U.S. PATENT DOCUMENTS

| | | | | |
|---|---|---|---|---|
| 2015/0267888 | A1* | 9/2015 | Suwa | F21S 41/635 362/512 |
| 2017/0050555 | A1* | 2/2017 | Chen | H04W 16/28 |
| 2021/0255004 | A1* | 8/2021 | Heishi | F21V 14/06 |
| 2021/0263301 | A1* | 8/2021 | Oshima | B60Q 1/04 |

FOREIGN PATENT DOCUMENTS

| | | | | | |
|---|---|---|---|---|---|
| CN | 108692266 | A | | 10/2018 | |
| CN | 110081391 | A | * | 8/2019 | F21V 14/06 |
| CN | 110081392 | A | * | 8/2019 | F21V 14/06 |
| CN | 112682721 | A | | 4/2021 | |
| CN | 214038252 | U | | 8/2021 | |
| EP | 3699662 | A1 | | 8/2020 | |
| EP | 3320260 | B1 | * | 9/2020 | F21S 8/026 |
| JP | 2001006409 | A | | 1/2001 | |

OTHER PUBLICATIONS

Huang et al., Light distribution assembly and illuminating apparatus, CN110081391A, 2019, https://worldwide.espacenet.com/patent/search/family/067416922/publication/CN110081391A?q=pn%3DCN110081391A (Year: 2019).*

International Search Report of PCT Application No. PCT/CN2021/140874 dated Mar. 22, 2022 with English translation, (6p).

* cited by examiner

LIGHT DISTRIBUTING COMPONENT WITH WEDGE PRISMS AND LIGHTING APPARATUS

CROSS-REFERENCE TO RELATED APPLICATIONS

This application is based upon and claims the priority of PCT patent application No. PCT/CN2021/140874 filed on Dec. 23, 2021 which claims priority to the Chinese patent application No. 202011576918.2, filed on Dec. 28, 2020 and the Chinese patent application No. 202023228488.3, filed on Dec. 28, 2020, the entire contents of which are hereby incorporated by reference herein for all purposes.

TECHNICAL FIELD

The present disclosure relates to the technological field of lighting, and more particularly, to a light distributing component and a lighting apparatus.

BACKGROUND

Usually, the lighting apparatus includes a base, and a light emitting assembly located in an accommodating cavity of the base. In recent years, with vigorous development of the LED technology, various LED lighting fixtures have been gradually developed. Application of spotlights is more extensive and flourishing, with increasingly detailed requirements in various scenarios; in many places, direct-lit mounting of spotlights can no longer meet customer needs. Therefore, a dimmable turn-around spotlight has been designed to expand more applications.

SUMMARY

The present disclosure provides a light distributing component and a lighting apparatus.

A light distributing component provided by the present disclosure may be used to change a light distribution path of a lighting apparatus, and may include a first lens and a first clamp holding portion; the first lens having a first light incident surface, a first light emergent surface, and a side portion located between the first light incident surface and the first light emergent surface; the first clamp holding portion being arranged on the side portion of the first lens.

The first lens may be a light path deflecting element, and an included angle may be between the first light incident surface and the first light emergent surface; the first light incident surface may be arranged on a transmission path of emergent light of the lighting apparatus, and may be used to receive the emergent light; and the first light emergent surface may emit out the emergent light to change a propagation path of the emergent light.

The present disclosure further provides a lighting apparatus. The lighting apparatus may include a base, a light emitting assembly, and the light distributing component as described above. The light emitting assembly may be arranged in the base to provide the emergent light; and the light distributing component may be mounted onto the base and may be used to receive the emergent light provided by the light emitting assembly, so as to change a propagation direction of the emergent light.

It is to be understood that the foregoing general description and the following detailed description are exemplary and explanatory only and are not restrictive of the disclosure.

BRIEF DESCRIPTION OF THE DRAWINGS

The drawings illustrated here are provided for further understanding the present disclosure and constitute a part of the present disclosure, and are used for explaining the present disclosure together with the examples of the present disclosure and description thereof, rather than improperly limiting the present disclosure. In the drawings.

DETAILED DESCRIPTION

Figure 1:
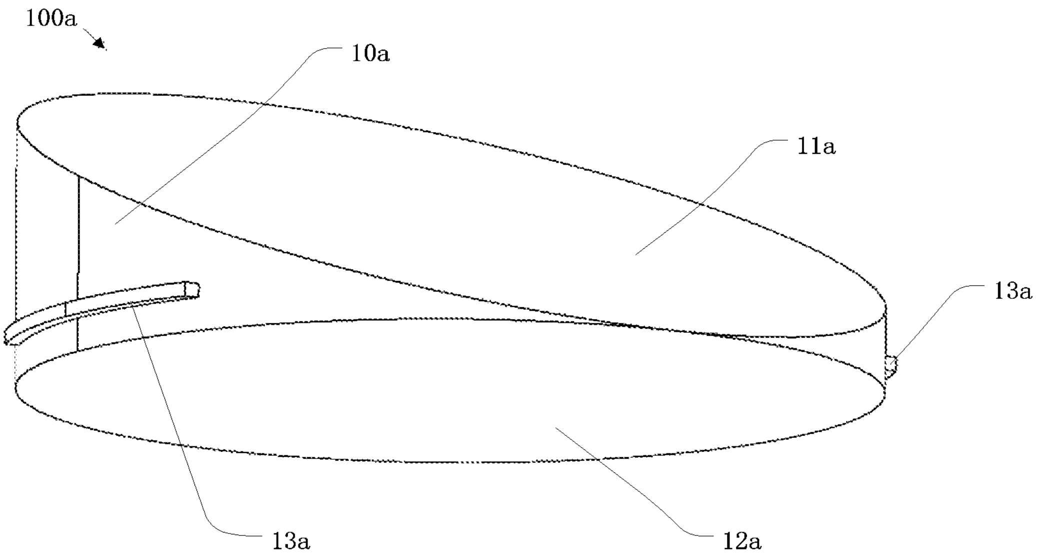
FIG. 1 is a structural diagram of a light distributing component according to Example 1 of the present disclosure.

In order to make objectives, technical details and advantages of the present disclosure apparent, the technical solutions of the present disclosure will be described in a clearly and fully understandable way in connection with the examples of the present disclosure and corresponding drawings. The explanation of the following examples is based on the accompanying diagrams to illustrate the examples that may be implemented in the present disclosure. Directional terms mentioned in the present disclosure, for example "up", "down", "front", "back", "left", "right", "top", "bottom", etc., are only used to illustrate examples of the present disclosure by referring to the direction of the accompanying diagrams. Therefore, the directional terms are used for explaining and understanding the present disclosure, and are not used for limiting the present disclosure. It is obvious that the described examples are just a part but not all of the examples of the present disclosure. Based on the described examples herein, those ordinarily skilled in the art can acquire other example(s), without any inventive work, which should be within the scope of the present disclosure.

Reference signs used in this disclosure may include:

100, 100*a*—light distributing components;

10, 10*a*—first lens; 11, 11*a*—first light incident surface;

12, 12*a*—first light emergent surface;

13*a*—first clamp holding portion;
20—second lens; 21—second light incident surface; 22—second light emergent surface;
200—lighting apparatus;
210—base; 211—light exit hole; 212—accommodating cavity; 213—bottom wall; 214—circumferential sidewall;
220—light source module;
230—lens mounting member; 231—guide portion;
240—third lens; 241—third light incident surface; 242—third light emergent surface;
250—lens fixing member; 251—first clamp connecting portion; 252—connecting rod;
260—face ring; 261—annular sidewall; 262—clamp connecting structure; 270—reflector; 271—reflective body; 272—second clamp connecting portion.

In order to implement the adjustability of light emergent angle, the light emitting assembly needs to rotate about a rotation axis, so that the light emitting assembly is capable of rotating relative to the base within the accommodating cavity; the current common technology is to adjust a lamp body of the spotlight through a mechanical structure to change a direction of emergent light.

Due to a fact that current adjustment of the light emitting assembly relative to the base is mechanical adjustment of the entire light emitting assembly, adjustment of the light emergent angle is not convenient enough and an effect thereof is not such ideal that usually a large amount of light emergent angle needs to be adjusted to implement such adjustment; if adjustment of the light emergent angle is limited, adjustment requirements of the light emergent angle cannot be fulfilled, and thus actual dimmable needs cannot be met. For example, an emergent light adjustment angle of the light emitting assembly relative to the base is only be deviated by 30 degrees; if it is expected to further increase the emergent light adjustment angle, for example, to adjust the light emergent angle to 45 degrees, mutual interference of mounting environment or its own structure may cause failure of adjustment or inconvenience of adjustment of the light emergent angle.

Meanwhile, an optical light emergent surface of the lighting apparatus is close to the interior, in the case that the light propagates outward, it may be reflected, causing superposition of light paths, so that a light spot is not round and complete enough, resulting in adverse light effects such as stray light and glare, thereby affecting visual quality.

Therefore, a novel light distributing component and a novel lighting apparatus need to be provided, so as to effectively solve the above-described problems.

Example 1 of a Light Distributing Component

As shown in FIG. 1, Example 1 of the present disclosure provides a light distributing component 100*a*, used for changing a light distribution path of a lighting apparatus, and including a first lens 10*a*. The first lens 10*a* has a first light incident surface 11*a* and a first light emergent surface 12*a*; wherein, the first lens 10*a* is a light path deflecting element, the first light incident surface 11*a* has an included angle with the first light emergent surface 12*a*; the first light incident surface 11*a* of the first lens 10*a* is arranged on a transmission path of emergent light of the lighting apparatus and is used to receive the emergent light; and the first light emergent surface 11*a* emits out the emergent light to change a propagation path of the emergent light.

In the example, a structure of the first lens 10*a* is a wedge-shaped refractive lens, or may also be referred to as a wedge-shaped prism or a wedge-shaped lens. It may be understood that due to the included angle between the first light incident surface 11*a* and the first light emergent surface 12*a*, in the case that the wedge-shaped refractive lens is arranged on the transmission path of the emergent light of the lighting apparatus (e.g., a dimmable turn-around spotlight), an original light path will be deflected by half of a required angle. For example, if a user has a requirement of 30° for the light emergent angle of the turn-around spotlight, after the downward emergent light passes through the wedge-shaped refractive lens, the emergent light will be deflected upwards by 15° because the included angle of the first lens 10*a* is set to 15°, and at this time, it is only necessary to continue to mechanically adjust the turn-around spotlight to one side upwards by 15°. For another example, if the user needs to achieve a direct-lit lighting effect, then after the downward emergent light passes through the wedge-shaped refractive lens, the emergent light will be deflected upwards by 15°, and at this time, it is only necessary to adjust the turn-around spotlight to the other side by 15°, so that the emergent light will be converted into a direct-lit lighting mode. It can be seen that in the present disclosure, by setting the first lens 10 as a wedge-shaped refractive lens, a rotation range of the turn-around spotlight can be reduced, thereby reducing an internal space of the lighting fixture required for mechanical turn-around, making it more convenient to place a mechanical rotation shaft position, and reducing a risk of interference between respective parts of the structure; moreover, the newly added light distributing component 100*a* is located close to the outside of the optical light emergent surface of the lighting apparatus, thereby causing the optical light emergent surface to shift outward, which can reduce impact of a secondary anti-glare system on the light path and obtain a round and complete light spot without stray light.

The first lens 10*a* has a side portion located between the first light incident surface 11*a* and the first light emergent surface 12*a*; the light distributing component 100*a* further includes a first clamp holding portion 13*a*; and the first clamp holding portion 13*a* is arranged on the side portion of the first lens 10*a*. In the case that the first clamp holding portion 13*a* and the first lens 10*a* are made of a same material, it is preferred that the first clamp holding portion 13*a* and the first lens 10*a* are an integrated structure which is fabricated during the lens fabrication; in the case that the first clamp holding portion 13*a* and the first lens 10*a* are made of different materials, it is preferred that the first clamp holding portion 13*a* is an elastic member. The first clamp holding portion 13*a* is configured to be capable of being snapped into an inner wall of a light exit of the lighting apparatus, so that the light distributing component 100 is sleeved and fixed onto the lighting apparatus, in order to prevent the first lens 10*a* from moving axially relative to the light exit of the lighting apparatus. In some examples, the first clamp holding portion 13*a* is a C-shaped spring. During an assembly process of the light distributing component 100*a* and the lighting apparatus, the C-shaped spring has a smaller curvature after being compressed, which can be fully accommodated in a gap between the light distributing component 100*a* and the lighting apparatus; after the light distributing component 100 is sleeved on and connected with the lighting apparatus, an extrusion force on the C-shaped spring is removed, resulting in a larger curvature of the C-shaped spring after it is reset, in this way, axial positioning of the light distributing component 100*a* and the lighting apparatus are implemented.

The first clamp holding portion 13*a* is arranged in pairs on the side portion of the first lens 10*a*, or is arranged in a semi-surrounding manner on the side portion of the first lens 10*a*.

The first clamp holding portion 13*a* and the first lens 10*a* are integrated structure. In the example, the first clamp holding portion 13*a* may be bonded to the first lens 10*a*.

The first lens 10*a* is a serrated-shaped deflective lens, a wedge-shaped refractive lens, or a cambered surface deflective lens; or the first lens 10*a* is a deflective lens formed by a combination of at least two of serrated shape, wedge shape, or cambered surface. In the example of the present disclosure, the first lens 10*a* is preferably a wedge-shaped refractive lens. Of course, as a variation, the first lens 10*a* may be a serrated-shaped deflective lens, or a cambered surface deflective lens, or a deflective lens formed by a combination of at least two of serrated shape, wedge shape, or cambered surface, or other lens capable of deflecting emergent light.

The first light incident surface 11*a* and the first light emergent surface 12*a* are both planar, and the included angle is acute. For example, the included angle range is ranged from 1 degree and 30 degrees. Of course, the present disclosure does not limit a specific value of the included angle, which may be determined according to the specific material of the first lens.

Example 2 of a Light Distributing Component

Figure 2:
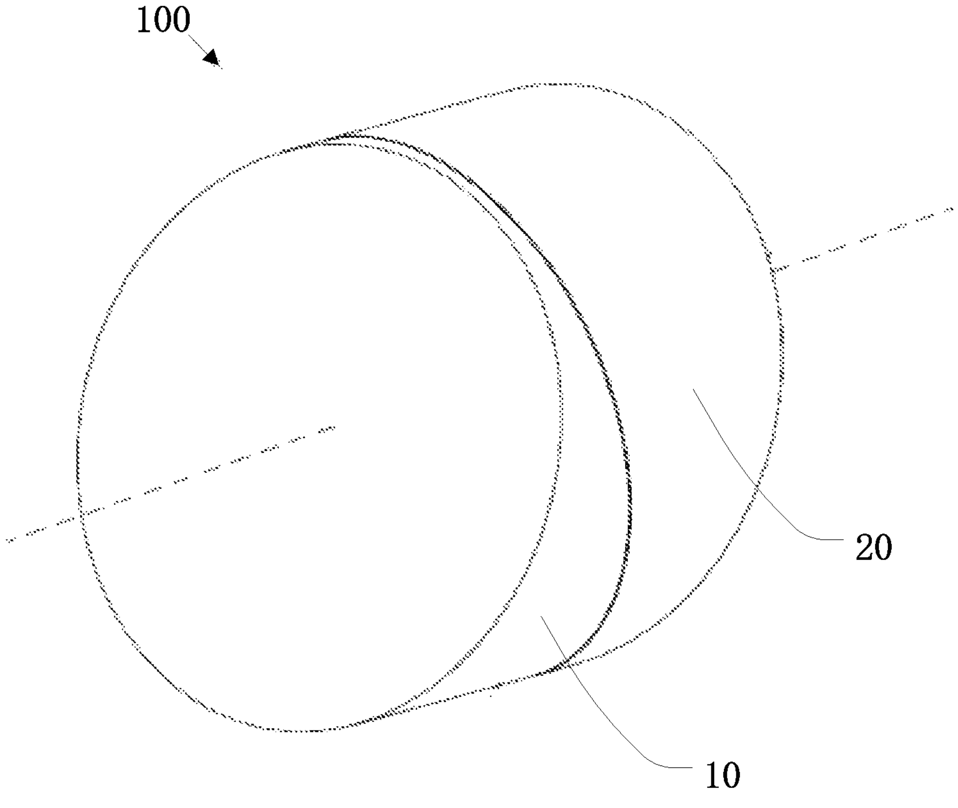
FIG. 2 is a structural diagram of a light distributing component according to Example 2 of the present disclosure.
Figure 3:
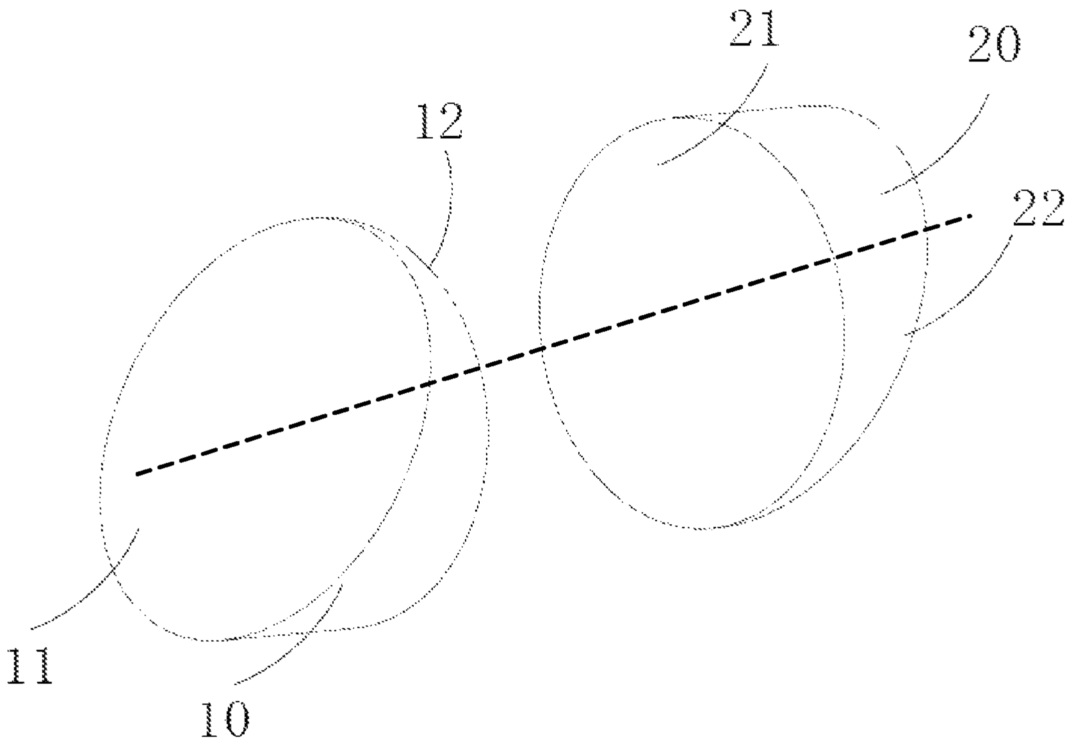
FIG. 3 is an exploded view of a light distributing component in FIG. 2.

As shown in FIG. 2 and FIG. 3, a light distributing component 100 provided by Example 2 of the present disclosure includes a first lens 10 and a second lens 20; the first lens 10 includes a first light emergent surface 12; the second lens 20 includes a second light incident surface 21; the second light incident surface 21 and the first light emergent surface 12 are arranged opposite to each other (i.e. facing towards to each other), so that emergent light passing through the first lens 10 is capable of entering the second lens 20 (or, according to a principle of light propagation, the emergent light passing through the second lens 20 may also enter the first lens 10), and light passes through the first lens 10 and the second lens 20 sequentially within the light distributing component 100 so as to be distributed. At least one of the first lens 10 and the second lens 20 is a light path deflecting element; for example, the first lens 10 is a light path deflecting element and adopts a structure of a wedge-shaped refractive lens, referring to Example 1. The second lens 20 may be a light path deflecting element (a wedge-shaped refractive prism), or may also be a non-light path deflecting element (e.g., a columnar lens, etc.). The first lens 10 may be rotatable relative to the second lens 20; and by rotating the first lens 10, the light distribution path of the light distributing component 100 can be changed. Accordingly, the light source provided with the light distributing component 100 achieves light path adjustment while maintaining a position of the light source unchanged. That is to say, the light emergent path of light emitted from the light source is adjusted through the light distributing component 100, and thus the light path emergent angle is adjusted.

The light distributing component 100 has an axis extending from the first lens 10 to the second lens 20 (referring to FIG. 2); and the first lens 10 is rotatable about the axis relative to the second lens 20, that is, the first lens 10 and the second lens 20 are coaxially arranged, and the first lens 10 is capable of rotating about the axis relative to the second lens 20. Wherein, a rotation stroke of the first lens 10 is from 10 degrees to 360 degrees, specifically, it is 30 degrees, 60 degrees, 90 degrees, 180 degrees, and so on. The rotation stroke is related to a light emergent angle to be adjusted and a range of a target region to be illuminated.

In the case that the first lens 10 and the second lens 20 are coaxially arranged, the above-described axis is a central axis of the light distributing component 100. In addition, the mechanical structure used for implementing relative rotation is a conventional technology in the field, and no details will be repeated here.

Taking the rotation stroke of the first lens 10 being 360 degrees as an example, if one of the first lens 10 and the second lens 20 is the light path deflecting element, the emergent light passing through the light distributing component 100 is deflected, no matter which position the first lens 10 rotates, that is, the light distributing component 100 according to the example of the present disclosure is the light path deflective component. At this time, if a deflection angle of the first lens 10 is large, an illumination trace of the light emitted by the light source through the light distributing component 100 may has an annular shape and is incapable of reaching the direct front of the light distributing component 100. If both the first lens 10 and the second lens 20 are light path deflecting elements, the light distributing component 100 will no longer undergo light path deflection at certain angles.

It should be noted that what is meant by "the first lens 10 is arranged rotatable relative to the second lens 20" according to Example 2 of the present disclosure is: in practical use, the first lens 10 is driven to rotate and the second lens 20 keeps stationary; or, the first lens 10 keeps stationary and the second lens 20 is driven to rotate, the standard of example is to change the light distribution path of the light distributing component 100.

In order to reduce a volume of the light distributing component 100 and reduce light attenuation, the first light emergent surface 12 and the second light incident surface 21 are arranged in parallel, so that the first light emergent surface 12 and the second light incident surface 21 are arranged with a small distance, that is, a large portion of the emergent light of the first light emergent surface 12 enters the second lens 20 from the second light incident surface 21. Of course, in some examples, the first light emergent surface 12 and the second light incident surface 21 have an included angle.

In order to further reduce light attenuation, an orthographical projection of the first light emergent surface 12 on the second light incident surface 21 overlaps with the second light incident surface 21, which ensures that all light emitted out of the first light emergent surface 12 is capable of passing through the second light incident surface 21 and entering the second lens 20. In some examples, due to special requirements for light deflection, the orthographical projection of the first light emergent surface 12 on the second light incident surface 21 may partially overlap or not overlap with the second light incident surface 21.

The first light emergent surface 12 and the second light incident surface 21 may be planar surfaces, so that the first lens 10 and the second lens 20 are assembled with a small distance, reducing the volume of the light distributing component 100. Of course, in some examples, the first light emergent surface 12 may be a cambered surface, a serrated surface, a wedge-shaped surface, etc., and the second light incident surface 21 may also be a cambered surface, a serrated surface, a wedge-shaped surface, etc.

A distance between the first light emergent surface 12 and the second light incident surface 21 is ranged from 1 mm to 10 mm, for example, 2 mm, 3 mm, 5 mm, 8 mm, etc. In practical applications, the distance between the first light emergent surface 12 and the second light incident surface 21 should be kept as small as possible without affecting assembly.

The first lens 10 further includes a first light incident surface 11 arranged opposite to the first light emergent surface 12; the second lens 20 further includes a second light emergent surface 22 arranged opposite to the second light incident surface 21; during rotation of the first lens 10 relative to the second lens 20, the included angle between a plane where the first light incident surface 11 is located and a plane where the second light emergent surface 22 is located is changed, so that a deflection angle of the light distribution path of the light distributing component 100 is changed.

Figure 4:
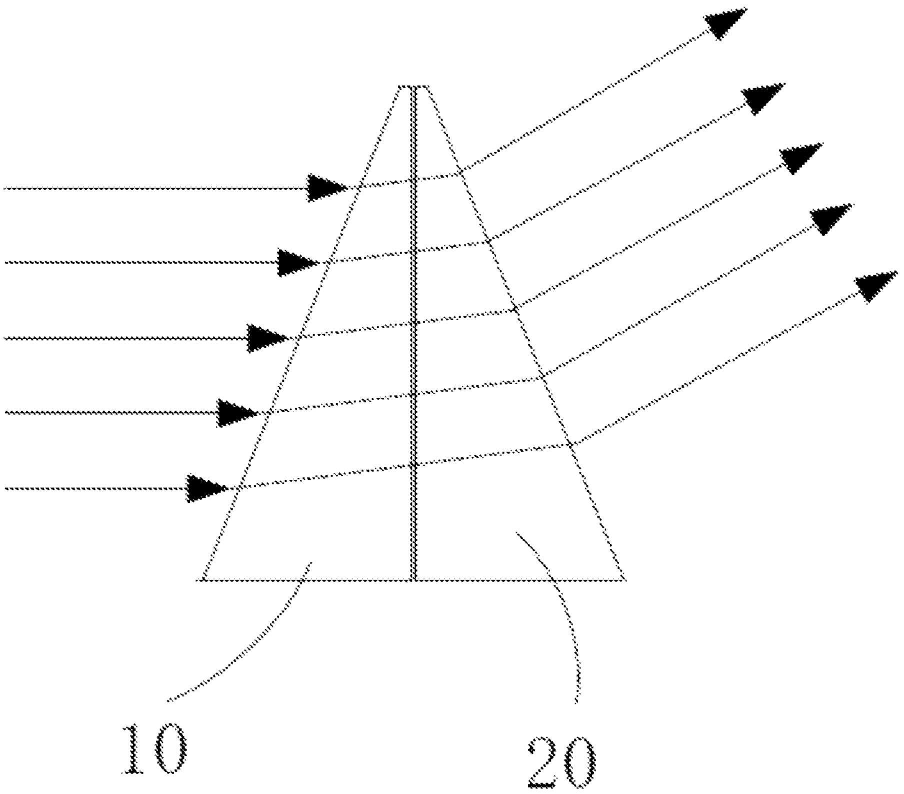
FIG. 4 is a diagram of a light distribution path of a light distributing component according to Example 2 of the present disclosure, mainly showing a situation in the case that a first light incident surface and a second light emergent surface have a first included angle.
Figure 5:
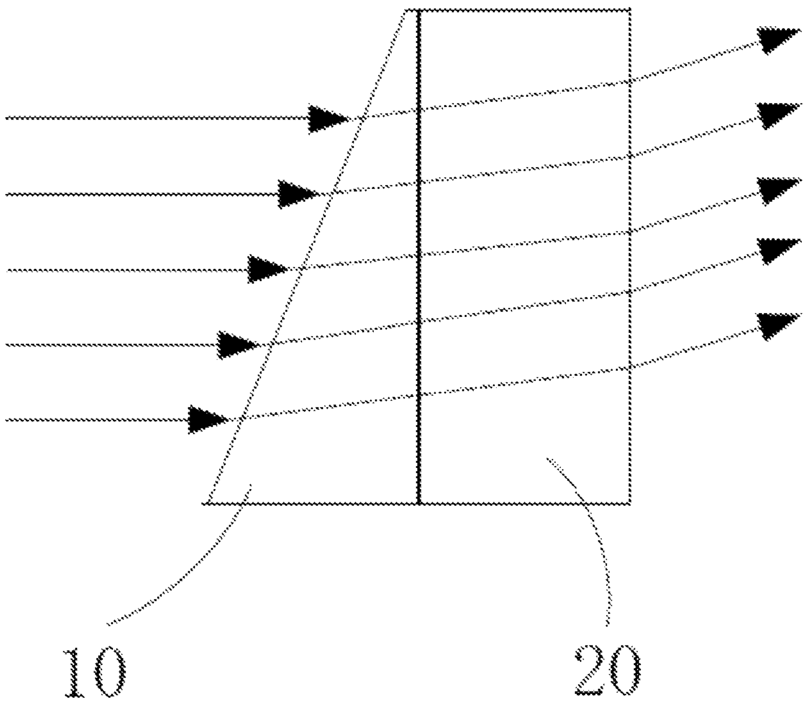
FIG. 5 is a diagram of a light distribution path of a light distributing component according to Example 2 of the present disclosure, mainly showing a situation in the case that a first light incident surface and a second light emergent surface have a second included angle.
Figure 6:
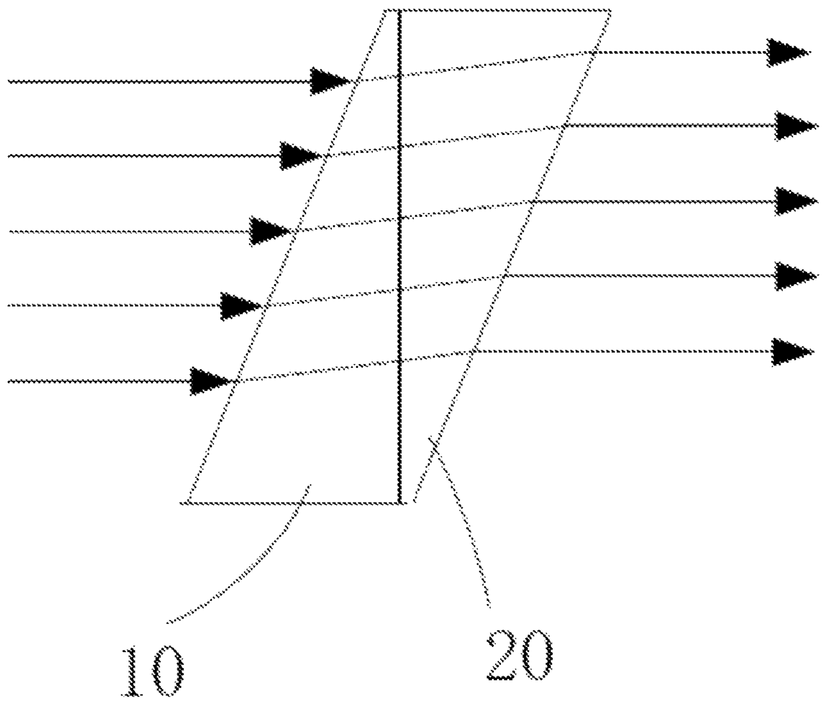
FIG. 6 is a diagram of a light distribution path of a light distributing component according to Example 2 of the present disclosure, mainly showing a situation in the case that a first light incident surface and a second light emergent surface are parallel to each other.

As shown in FIG. 4, the first light emergent surface 12 and the second light incident surface 21 are arranged parallel to each other, at this time, the included angle between the plane where the first light incident surface 11 is located and the plane where the second light emergent surface 22 is located is a first included angle, and the first included angle shown in FIG. 4 is the maximum included angle formed by the first light incident surface 11 and the second light emergent surface 22, and thus the light distribution path of the light distributing component 100 has the maximum deflection angle. As shown in FIG. 5, the included angle between the first light incident surface 11 and the second light emergent surface 22 is a second included angle; the second included angle is smaller than the first included angle; the deflection angle of the light distribution path of the light distributing component 100 is smaller than that in FIG. 4. As shown in FIG. 6, in the case that the first light incident surface 11 and the second light emergent surface 22 are parallel to each other, i.e. the included angle between the two is zero, there is no deflection angle on the light distribution path of the light distributing component 100, and the light distributing component 100 is a non-deflective component; however, all the emergent light passing through the light distributing component 100 are translated, specifically in FIG. 6, all the emergent light are translated upwardly as compared with the incident light.

In order to ensure the light distributing component 100 to not deflect emergent light during use and facilitate modular processing, the first lens 10 and the second lens 20 are same optical elements and symmetrically assembled to form the light distributing component 100. As shown in FIG. 4 to FIG. 6, the first lens 10 and the second lens 20 are same optical elements, which are symmetrically arranged in FIG. 4; and in FIG. 6, the first light incident surface 11 and the second light emergent surface 22 are mounted parallel to each other.

The number of deflective lenses in the light distributing component 100 according to Example 2 of the present disclosure may be more than two, for example, three, or four, etc., that is, in addition to the first lens 10 being a deflective lens, the light distributing component 100 further includes a second lens 20 and the first lens 10 and the second lens 20 are arranged opposite to each other, which can also implement adjustment of the light emergent angle while keeping the light source module 220 stationary.

Example of a Lighting Apparatus

Figure 7:
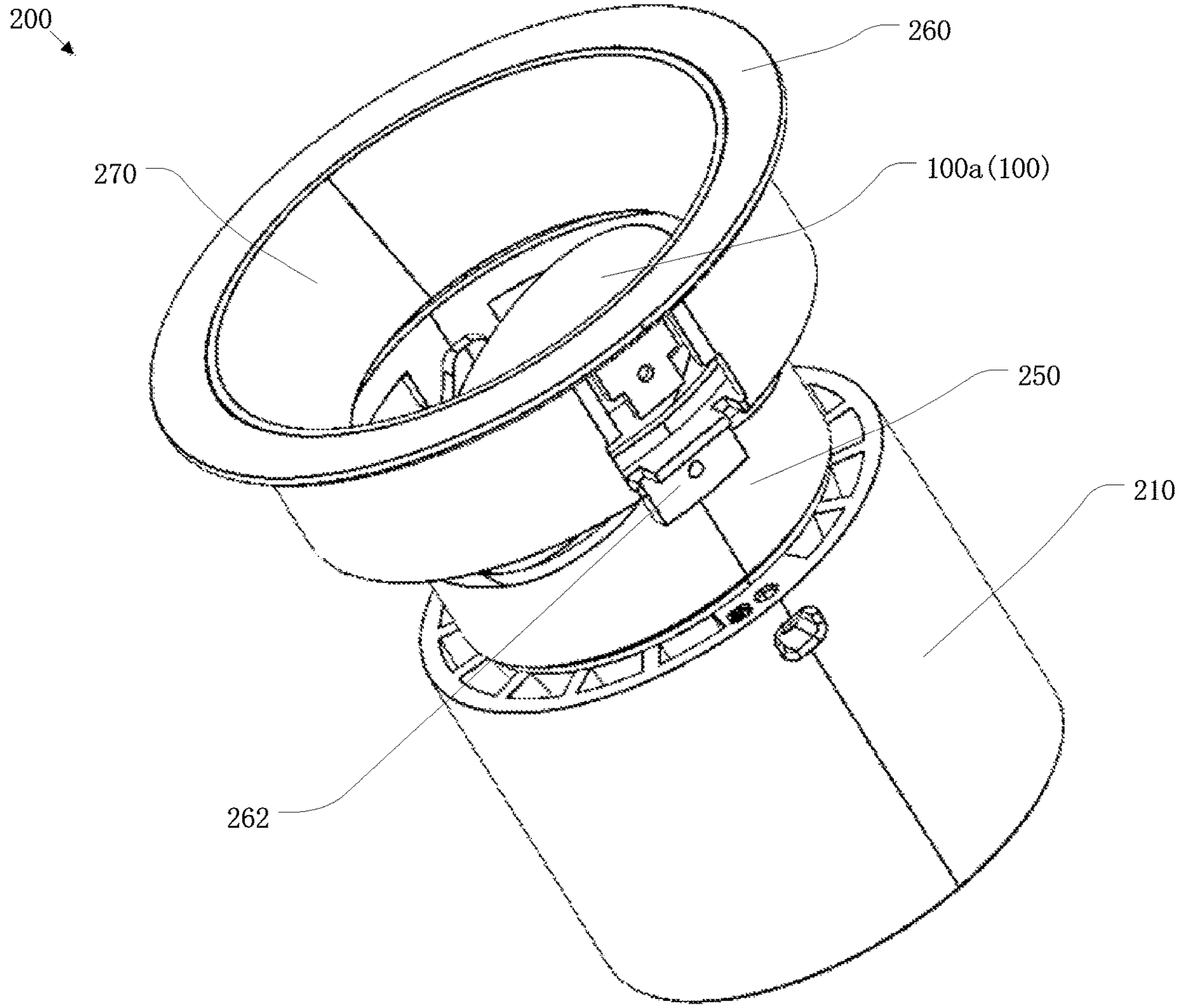
FIG. 7 is a structural diagram of a lighting apparatus in one of examples according to the present disclosure.
Figure 8:
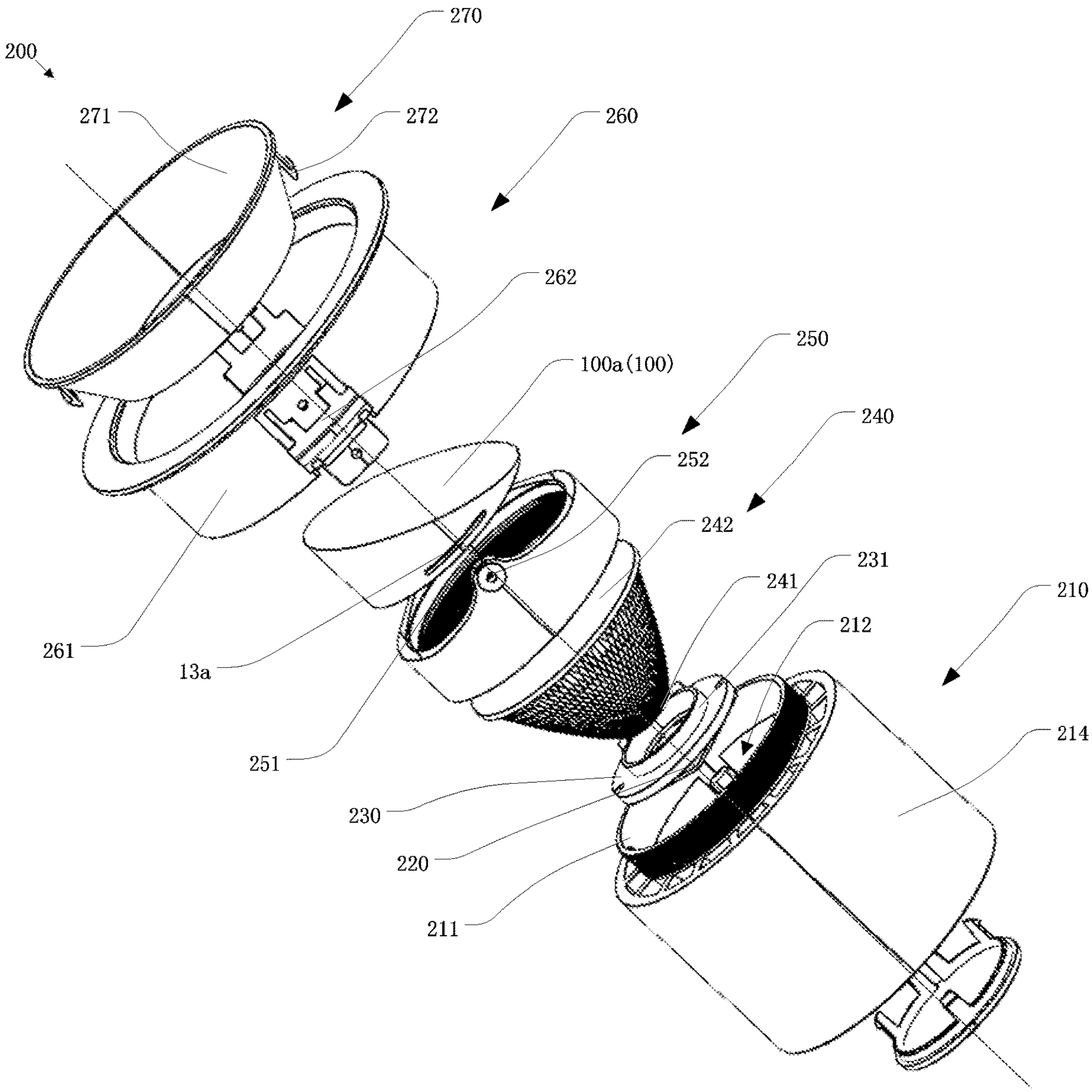
FIG. 8 is an exploded view of a lighting apparatus in FIG. 7.
Figure 9:
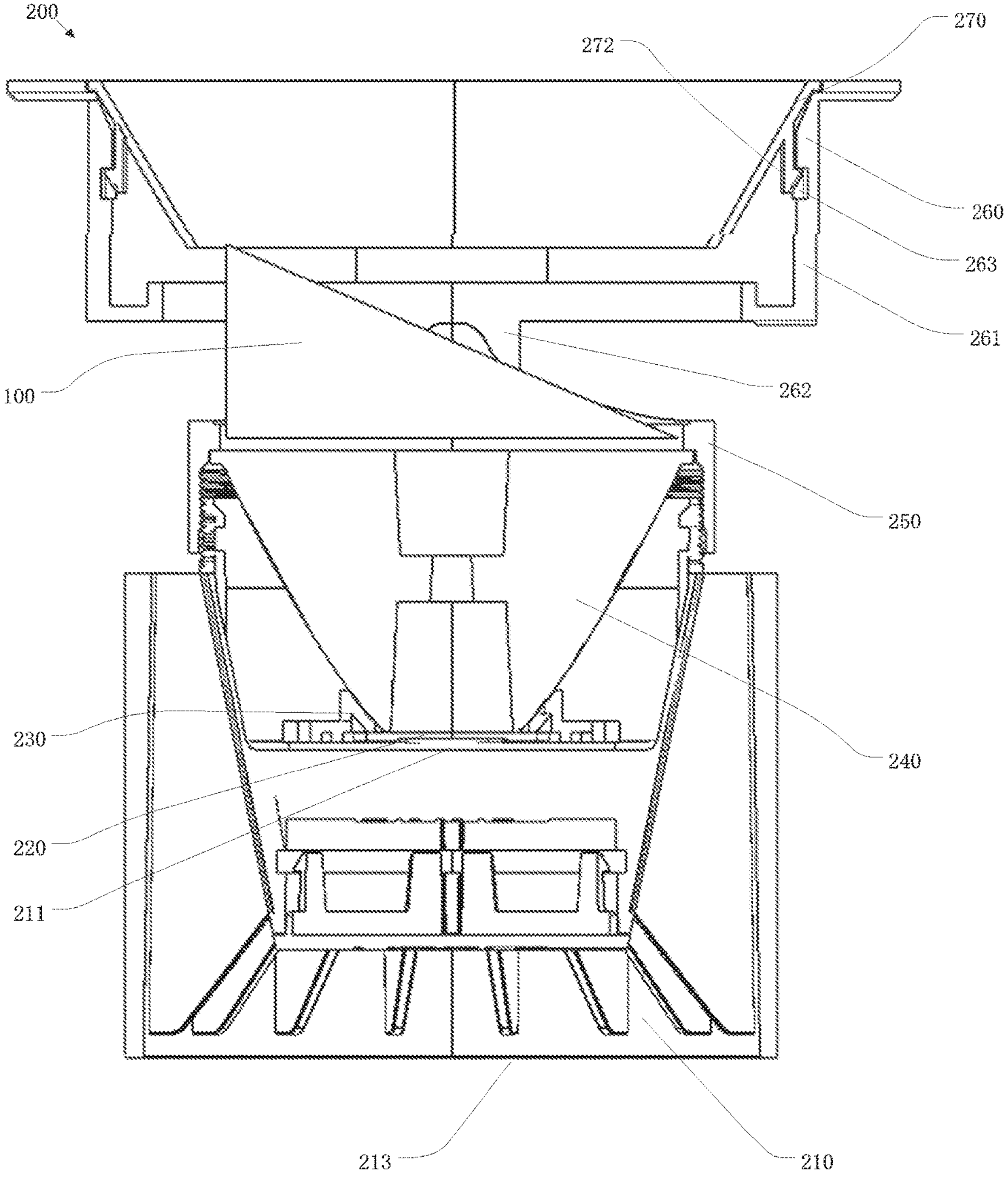
FIG. 9 is a cross-sectional view of a lighting apparatus in FIG. 7.

As shown in FIG. 7 to FIG. 9, the present disclosure provides a lighting apparatus 200; in the example, the lighting apparatus 200 includes a base 210, a light emitting assembly, and the light distributing component 100*a* according to Example 1 or the light distributing component 100 according to Example 2, which will be uniformly described as the light distributing component 100 hereinafter.

Specifically, the base 210 includes a light exit hole 211, an accommodating cavity 212 in communication with the light exit hole 211, and a bottom wall 213 arranged opposite to the light exit hole 211. The light emitting assembly is arranged in the accommodating cavity 212 and is capable of emitting light towards the light exit hole 211. The light distributing component 100 is mounted on the base 210 and close to the light exit hole 211, and is used to receive light from the light emitting assembly, and to distribute the emergent light of the light emitting assembly (i.e. adjust the light path), so as to change the propagation direction of the emergent light. In the process of using the lighting apparatus 200, the light distributing component 100 is driven to rotate relative to the lighting apparatus 200, so as to implement circumferential rotation of the light distributing component 100 relative to the lighting apparatus 200, thereby changing a deflection direction and a deflection angle of the emergent light of the lighting apparatus 200, and implementing adjustment of the light emergent angle of the lighting apparatus 200.

The light emitting assembly includes a light source module 220; the light source module 220, serving as a light source, is arranged on the light source board and faces towards the light exit hole 211.

In order to implement better heat dissipation, the base 210 is made of a metal material, for example, aluminum. In addition, the light source board adheres to the bottom wall 213, allowing heat of a light source sub-module to be quickly dissipated. A wiring hole is arranged on the bottom wall 213, and a conductive wiring runs through the wiring hole and is connected with a power sub-module, to implement electrical connection. A heat dissipating fin is arranged on an outer surface of the bottom wall 213 that faces away from the light source board, and helps to dissipate heat. In addition, an annular groove may be arranged on an outer surface of a peripheral sidewall 214, to enhance an aesthetic appearance of the base 210.

The light emitting assembly further includes a third lens 240; the third lens 240 covers the light source module 220 and includes a third light incident surface 241 and a third light emergent surface 242 arranged opposite to each other; the third light incident surface 241 covers the light source module 220; and the third light emergent surface 242 faces towards the first light incident surface 11 of the first lens 10. Specifically, the third light incident surface 241 may be a concave surface, so the first light incident surface 11 of the first lens 10 faces towards the third light incident surface 241, and thus the structure of the lighting fixture is more compact.

In order to implement fixation of the third lens 240, the light emitting assembly further includes a lens mounting member 230 and a lens fixing member 250.

The lens mounting member 230 is connected with the bottom wall 213 in the accommodating cavity 212 and surrounds the light source module 220. The lens mounting member 230 includes a guide portion 231 distributed along a circumferential direction; the guide portion 231 is arranged facing towards a direction of the light exit hole 211, to define a position of the third lens 240 on a radial plane inside the accommodating cavity 212. The guide portion 231 on the lens mounting member 230 is annular and distributed in a circumferential direction. The lens mounting member 230 is sleeved between the third lens 240 and the base 210.

The lens fixing member 250 serves as a portion of the lighting apparatus, an inner wall of the lens fixing member 250 is arranged with a first clamp connecting portion 251; and the clamp holding portion 13 cooperates with the first clamp connecting portion 251 to define a position of the first lens 10 in the lens fixing member 250 in a circumferential direction. Specifically, in order to improve a connection strength of the first lens 10 on an inner wall of the lens fixing member 250, one of the first clamp holding portion 13 and the first clamp connecting portion 251 is a protrusion, while the other is a groove, thereby implementing a clamping connection between the first clamp holding portion 13 and the first clamp connecting portion 251. In the example, it is preferred that the first clamp holding portion 13 is a protrusion, and the first clamp connecting portion 251 is a groove. The lens fixing member 250 is connected with the base 210, preferably in a threaded connection manner, to implement fixation of the third lens 240.

In order to facilitate rotational adjustment of the light distributing component 100 within the lighting apparatus, the first clamp connecting portion 251 is an annular groove; and the first clamp holding portion 13 is clamped with the first clamp connecting portion 251 in a sliding manner.

In other examples, the first lens 10*a* is bonded to the light exit of the lighting apparatus without providing the first clamp connecting portion 251.

The base 210 includes a peripheral sidewall 214, the peripheral sidewall 214 surrounds the light exit hole 211 and the accommodating cavity 212 and is connected with the bottom wall 213.

The lighting apparatus 200 further includes a face ring 260; the face ring 260 includes an annular sidewall 261; the annular sidewall 261 includes an inner surface facing towards the axis; and the face ring 260 is connected with the base 210 and is away from the bottom wall 213.

The lighting apparatus 200 further includes a reflector 270; the reflector 270 includes a reflective body 271 and a second clamp connecting portion 272. The reflective body 271 includes a reflective surface and a backlight surface arranged opposite to each other, as well as a reflective inlet and a reflective outlet arranged opposite to each other. The reflector 270 is accommodated in the face ring 260, and the reflective inlet is closer to the light emitting assembly relative to the reflective outlet. The face ring 260 is further arranged with a second clamp holding portion 263, and the second clamp holding portion 263 is arranged on an inner side of the annular sidewall 261. The second clamp holding portion 263 is arranged along a circumferential direction, and the second clamp connecting portion 272 is clamped with an inside of the second clamp holding portion 263.

In order to implement a rotatable connection between the face ring 260 and the lens fixing member 250, a clamp connecting structure 262 is further provided on an outer side of the annular sidewall 261 of the face ring 260, and the clamp connecting structure 262 is arranged in pairs; the lens fixing member 250 is arranged with a connecting rod 252 on a side facing towards the face ring 260; and the clamp connecting structure 262 is fixed to the connecting rod 252 in a clamping or screwed manner, which can implement a rotatable connection between the face ring 260 and the lens fixing member 250.

Figure 10:
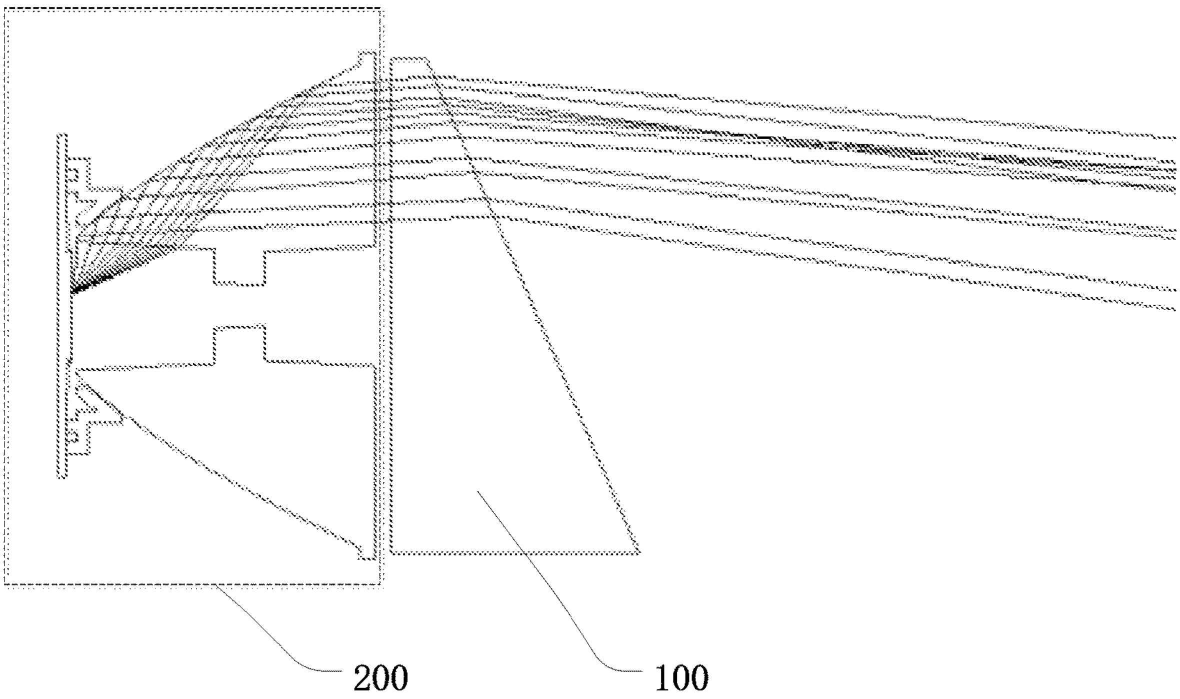
FIG. 10 is a principle diagram of using a light distributing component to change a light distribution path of a lighting apparatus according to the present disclosure.

As shown in FIG. 10, FIG. 10 is a principle diagram of using a light distributing component 100 to change a light distribution path of the lighting apparatus according to the present disclosure. It may be understood that since the first lens 10 is a wedge-shaped refractive prism, in the case that the wedge-shaped refractive prism is arranged on a propagation path of the emergent light of the lighting apparatus 200, the original light path is deflected by a certain angle, for example, by half of the turn-around angle required for deflection. For another example, assuming that the turn-around requirement of the lighting apparatus 200 is 30° and the included angle of the first lens 10 is set to 15°, after the emergent light passes through the wedge-shaped refractive prism, the light emergent angle is deflected by 15°; in order to reach 30°, only mechanical adjustment of 15° is required for the lighting apparatus 200. In the case that a direct-lit mode is needed, the lighting apparatus 200 is mechanically adjusted to the other side by 15°, so that the beam is in a direct-lit mode, which reduces internal space of the lighting fixture required for mechanical turn-around of the lighting apparatus 200, makes it more convenient to place the position of the mechanical shaft connecting rod 252, and reduces a risk of interference between respective parts of the structure; moreover, the newly added light distributing component 100 is located close to the outside of the optical light emergent surface of the lighting apparatus 200, causing the optical light emergent surface to shift outward, which can reduce impact of the secondary anti-glare system on the light path, and obtain a round and complete light spot without stray light.

The present disclosure provides a light distributing component and a lighting apparatus, for the purpose of solving the technical problems that the lighting apparatus is incapable of meeting adjustment requirements of a light reflection angle, due to limitation to the emergent light adjustment angle of the light emitting assembly relative to the base, resulting in inconvenient and unsatisfactory adjustment of the light emergent angle.

An objective of the present disclosure is to provide a light distributing component and a lighting apparatus, capable of more conveniently adjusting the light emergent angle, and capable of obtaining better light efficiency, thereby improving optical quality.

The light distributing component provided by the present disclosure may be used to change a light distribution path of a lighting apparatus, and may include a first lens and a first clamp holding portion; the first lens having a first light incident surface, a first light emergent surface, and a side portion located between the first light incident surface and the first light emergent surface; the first clamp holding portion being arranged on the side portion of the first lens.

The first lens may be a light path deflecting element, and an included angle may be between the first light incident surface and the first light emergent surface; the first light incident surface may be arranged on a transmission path of emergent light of the lighting apparatus, and may be used to receive the emergent light; and the first light emergent surface may emit out the emergent light to change a propagation path of the emergent light.

Further, the first clamp holding portion is an elastic member; and the first clamp holding portion is capable of being embedded in an inner wall of a light exit of the lighting apparatus.

Further, the first clamp holding portion and the first lens are integrated structure.

Further, the first light incident surface and the first light emergent surface are both planar surfaces, and the included angle is an acute angle.

Further, the light distributing component may include a second lens; the second lens comprises a second light incident surface; the second light incident surface and the first light emergent surface are arranged opposite to each other; wherein, at least one of the first lens and the second lens is a light path deflecting element, the first lens is rotatably arranged relative to the second lens, to change a light distribution path of the light distributing component;

the first lens and the second lens are arranged coaxially, and the first lens is capable of rotating about the axis relative to the second lens.

Further, the first light emergent surface and the second light incident surface are arranged parallel to each other.

The present disclosure further provides lighting apparatus, which may include a base, a light emitting assembly, and a light distributing component as described above; The light emitting assembly may be arranged in the base to provide the emergent light; and the light distributing component may be mounted onto the base and may be used to receive the emergent light provided by the light emitting assembly, so as to change a propagation direction of the emergent light.

Further, the base may include a light exit hole, an accommodating cavity in communication with the light exit hole, and a bottom wall arranged opposite to the light exit hole; the light emitting assembly is arranged in the accommodating cavity and provides the emergent light towards the light exit hole; and the light distributing component is fixed to the base and is close to the light exit hole.

Further, the light emitting assembly may include a light source module; the light source module comprises a light source board and a light emitting unit; and the light emitting unit is arranged on the light source board and faces towards the light exit hole.

Further, the light emitting assembly may include a third lens; the third lens covers on the light source module; the third lens may include a third light incident surface and a third light emergent surface arranged opposite to each other; and the third light emergent surface faces towards the first light incident surface of the first lens.

Further, the light emitting assembly may include a lens mounting member, a lens fixing member, and a light source module; the lens mounting member is connected with the bottom wall and surrounds the light source module; the lens mounting member has a guide portion distributed along a circumferential direction; and the guide portion is arranged facing towards the light exit hole to define a position of the third lens.

Further, an inner wall of the lens fixing member is provided with a first clamp connecting portion; a first clamp holding portion is provided on a side portion of the first lens; and the first clamp holding portion cooperates with the first clamp connecting portion.

Further, the lighting apparatus may include a face ring; the face ring may include an annular sidewall; and the face ring is connected with the base and is away from the bottom wall.

Further, the lighting apparatus may include a reflector; the reflector may include a reflective body; the reflective body may include a reflective inlet and a reflective outlet arranged opposite to each other; the reflector is accommodated in the face ring; and the reflective inlet is close to the light emitting assembly.

Further, the reflector may include a second clamp connecting portion; the face ring is further provided with a second clamp holding portion; the second clamp holding portion is arranged on an inner side of the annular sidewall and along a circumferential direction; and the second clamp connecting portion is clamped with an inside of the second clamp holding portion.

Advantageous effects of the present disclosure are that: a light distributing component and a lighting apparatus are proposed; the light distributing component is arranged on the transmission path of the emergent light thereof when the lighting apparatus is limited by the emergent light adjustment angle of the light emitting assembly relative to the base, so that an angle of the light distribution path of the lighting apparatus is further changed, which meets adjustment requirements of the light reflection angle, and makes adjustment of the light emergent angle convenient and have satisfactory effects.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The objective, technical solutions and beneficial effects of the present disclosure are further explained in detail in the examples as described above. It should be understood that the foregoing examples merely are examples of the present disclosure, and not intended to limit the present disclosure. Any modification, equivalent substitution, improvement, and the like, made within the spirit and principles of the present disclosure should be covered within the protection scope of the present disclosure.

The invention claimed is:

1. A light distributing component for changing a light distribution path of a lighting apparatus, comprising:

a first lens, having a first light incident surface, a first light emergent surface, and a side portion located between the first light incident surface and the first light emergent surface; and a first clamp holding portion, arranged in a semi-surrounding manner on the side portion of the first lens;

wherein the first lens is a light path deflecting element, and an included angle is between the first light incident surface and the first light emergent surface;

the first light incident surface is arranged on a transmission path of emergent light of the lighting apparatus to receive the emergent light; and the first light emergent surface emits out the emergent light to change a propagation path of the emergent light; and the first clamp holding portion is C-shaped, partially covering an annular surface of the side portion of the first lens.

2. The light distributing component according to claim 1, wherein the first clamp holding portion is an elastic member; and the first clamp holding portion is configured to prevent the first lens from moving in an axial direction of a light exit of the lighting apparatus.

3. The light distributing component according to claim 1, wherein the first clamp holding portion and the first lens are an integrated structure.

4. The light distributing component according to claim 1, wherein the first light incident surface and the first light emergent surface are both planar surfaces, and the included angle is an acute angle.

5. The light distributing component according to claim 1, wherein the light distributing component further comprises a second lens; the second lens comprises a second light incident surface; the second light incident surface and the first light emergent surface are arranged opposite to each other; and at least one of the first lens and the second lens is a light path deflecting element, the first lens is rotatably arranged relative to the second lens, to change a light distribution path of the light distributing component; the first lens and the second lens are arranged coaxially, and the first lens is capable of rotating about the axis relative to the second lens.

6. The light distributing component according to claim 5, wherein the first light emergent surface and the second light incident surface are arranged parallel to each other.

7. A lighting apparatus, comprising a base, a light emitting assembly, and a light distributing component, wherein the light distributing component comprises:

a first lens, having a first light incident surface, a first light emergent surface, and a side portion located between the first light incident surface and the first light emergent surface; and a first clamp holding portion, arranged in a semi-surrounding manner on the side portion of the first lens;

wherein the first lens is a light path deflecting element, and an included angle is between the first light incident surface and the first light emergent surface;

the first light incident surface is arranged on a transmission path of emergent light of the lighting apparatus to receive the emergent light; and the first light emergent surface emits out the emergent light to change a propagation path of the emergent light;

the light emitting assembly is arranged in the base to provide the emergent light; and the light distributing component is mounted onto the base and used to receive the emergent light provided by the light emitting assembly, so as to change a propagation direction of the emergent light; and the first clamp holding portion is C-shaped, partially covering an annular surface of the side portion of the first lens.

8. The lighting apparatus according to claim 7, wherein the base comprises a light exit hole, an accommodating cavity in communication with the light exit hole, and a bottom wall arranged opposite to the light exit hole; the light emitting assembly is arranged in the accommodating cavity and provides the emergent light towards the light exit hole; and the light distributing component is fixed to the base and is close to the light exit hole.

9. The lighting apparatus according to claim 8, wherein the light emitting assembly comprises a light source module; the light source module comprises a light source board and a light emitting unit; and the light emitting unit is arranged on the light source board and faces towards the light exit hole.

10. The lighting apparatus according to claim 9, wherein the light emitting assembly further comprises a third lens; the third lens covers on the light source module; the third lens comprises a third light incident surface and a third light emergent surface arranged opposite to each other; and the third light emergent surface faces towards the first light incident surface of the first lens.

11. The lighting apparatus according to claim 10, wherein the light emitting assembly further comprises a lens mounting member, a lens fixing member, and the light source module; the lens mounting member is connected with the bottom wall and surrounds the light source module; the lens mounting member has a guide portion distributed along a circumferential direction; and the guide portion is arranged facing towards the light exit hole to define a position of the third lens.

12. The lighting apparatus according to claim 11, wherein an inner wall of the lens fixing member is provided with a first clamp connecting portion; the first clamp holding portion cooperates with the first clamp connecting portion, and the first clamp holding portion is configured to prevent the first lens from moving in an axial direction of the light exit of the lighting apparatus.

13. The lighting apparatus according to claim 8, wherein the lighting apparatus further comprises a face ring; the face ring comprises an annular sidewall; and the face ring is connected with the base and is away from the bottom wall.

14. The lighting apparatus according to claim 13, wherein the lighting apparatus further comprises a reflector; the reflector comprises a reflective body; the reflective body comprises a reflective inlet and a reflective outlet arranged opposite to each other; the reflector is accommodated in the face ring; and the reflective inlet is close to the light emitting assembly.

15. The lighting apparatus according to claim 14, wherein the reflector further comprises a second clamp connecting portion; the face ring is further provided with a second clamp holding portion; the second clamp holding portion is arranged on an inner side of the annular sidewall and along a circumferential direction; and the second clamp connecting portion is clamped with an inside of the second clamp holding portion.

16. A method of configuring a light distributing component to change a light distribution path of a lighting apparatus, the method comprising:

configuring a first lens to have a first light incident surface, a first light emergent surface, and a side portion located between the first light incident surface and the first light emergent surface; and arranging a first clamp holding portion in a semi-surrounding manner on the side portion of the first lens;

wherein the first lens is a light path deflecting element, and an included angle is between the first light incident surface and the first light emergent surface;

the first light incident surface is arranged on a transmission path of emergent light of the lighting apparatus to receive the emergent light; and the first light emergent surface emits out the emergent light to change a propagation path of the emergent light; and the first clamp holding portion is C-shaped, partially covering an annular surface of the side portion of the first lens.

17. The method according to claim 16, wherein the first clamp holding portion is an elastic member; and the first clamp holding portion is configured to prevent the first lens from moving in an axial direction of the light exit of the lighting apparatus.

18. The method according to claim 16, wherein the first clamp holding portion and the first lens are an integrated structure.

19. The method according to claim 16, wherein the first light incident surface and the first light emergent surface are both planar surfaces, and the included angle is an acute angle.

20. The method according to claim 16, wherein the light distributing component further comprises a second lens; the second lens comprises a second light incident surface; the second light incident surface and the first light emergent surface are arranged opposite to each other; and at least one of the first lens and the second lens is a light path deflecting element, the first lens is rotatably arranged relative to the second lens, to change a light distribution path of the light distributing component; the first lens and the second lens are arranged coaxially, and the first lens is capable of rotating about the axis relative to the second lens.

* * * * *